CASE FOR CAMERA

Filed April 13, 1956 2 Sheets-Sheet 1

INVENTOR.
RENE LOPEZ
BY
Joltan P. Polachek
ATTORNEY

Nov. 4, 1958

R. LOPEZ 2,858,751

CASE FOR CAMERA

Filed April 13, 1956

INVENTOR.

RENE LOPEZ

BY Zoltan H. Polachek

ATTORNEY

United States Patent Office 2,858,751 Patented Nov. 4, 1958

2,858,751

CASE FOR CAMERA

Rene Lopez, New York, N. Y.

Application April 13, 1956, Serial No. 578,040

1 Claim. (Cl. 95—11)

This invention concerns an articulated case or cabinet useful for a camera and radio receiver.

It is a principal object of the invention to provide an articulated case for a camera or the like.

It is a further object to provide an articulated case having a pair of hinged sections and useful for a combined camera and radio receiver.

In the present invention the several sections can be pivoted to expose one side of the camera for loading film and to expose the interior of the radio receiver for servicing. In normal operation the camera and radio sections are juxtaposed so that pictures can be taken while the radio receiver is playing. The received broadcast program may serve to divert the attention of a person being photographed so that a more satisfactory picture can be taken. The case has a handle for convenience in carrying the combined camera and radio receiver and a tripod socket for use with a tripod.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
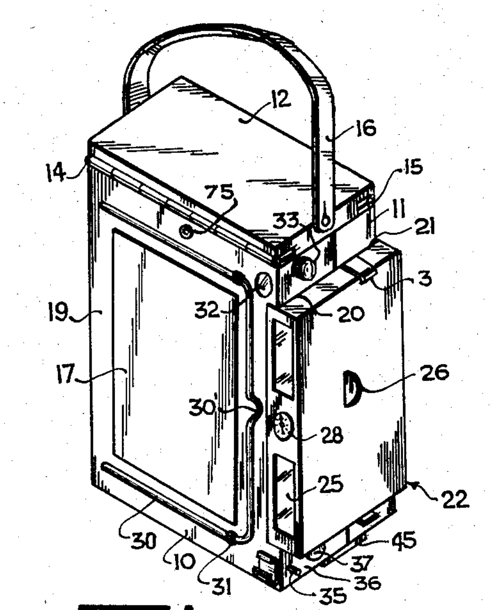
Fig. 1 is a perspective view showing the camera sides of the device embodying the invention.
Figure 2:
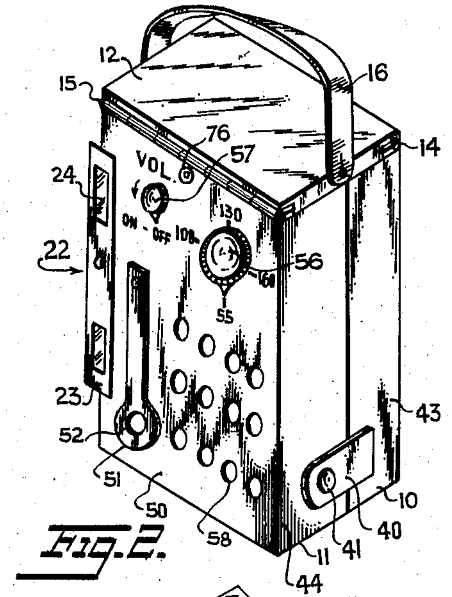
Fig. 2 is a perspective view showing the radio sides of the device.
Figure 3:
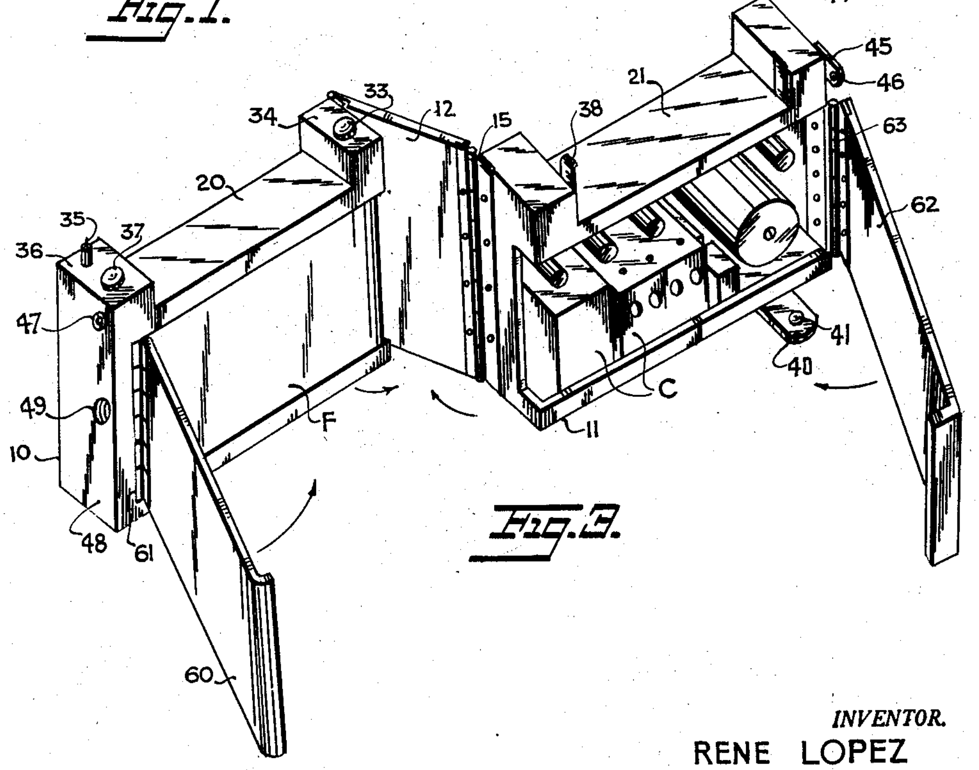
Fig. 3 is a perspective view of the device with the several sections opened.
Figures 4, 5, 6:
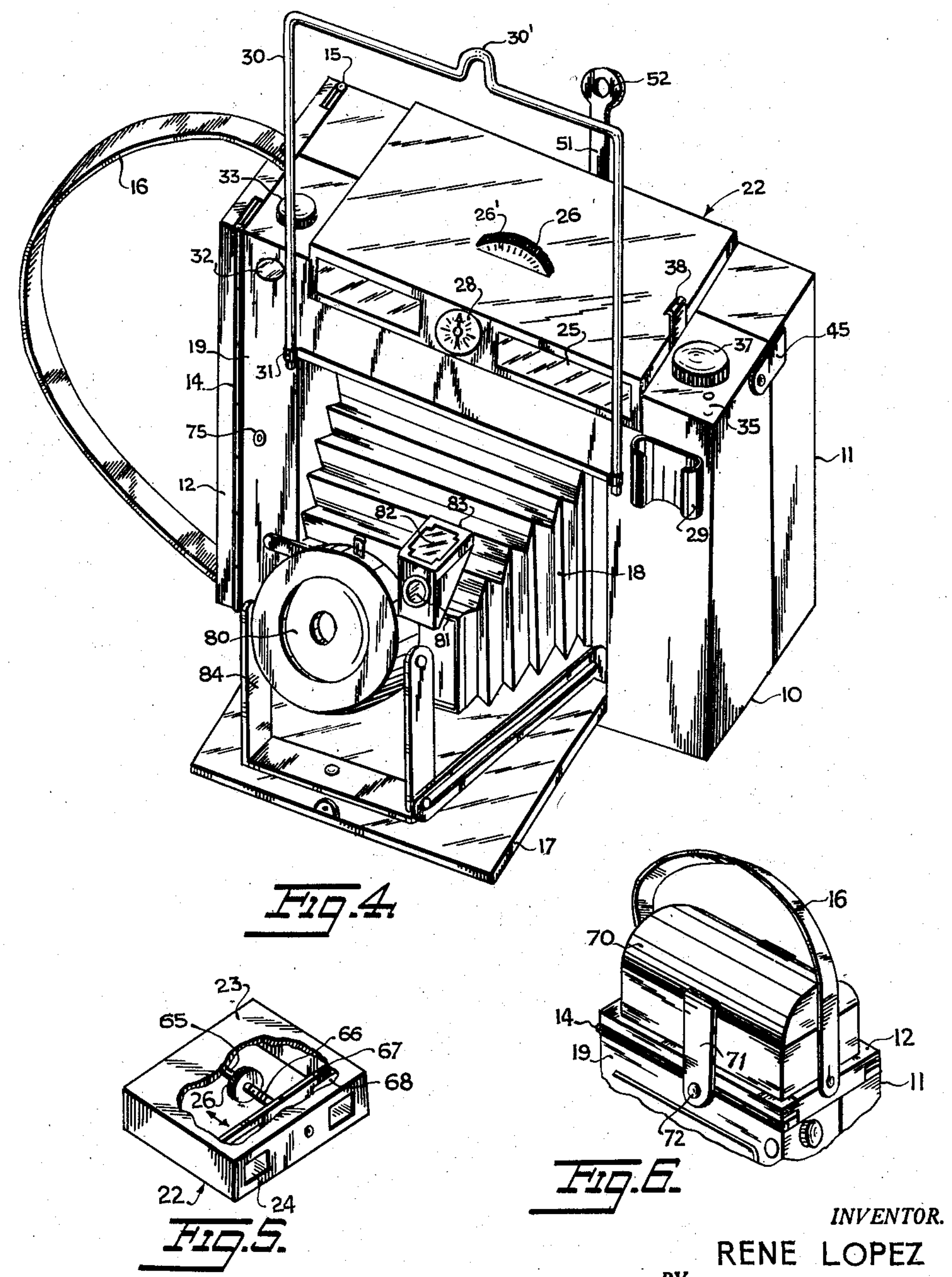
Fig. 4 is a perspective view of the device with camera bellows extended.
Fig. 5 is a perspective view of a sighting member with a portion cut away to show internal parts.
Fig. 6 is a fragmentary perspective view of the device with an accessory kit mounted thereon.

In Figs. 1 and 2 is shown a casing which is generally cubical in form provided with two generally rectangular hollow sections 10 and 11. To one end of the section 10 is pivotally attached a cover plate 12 by means of a hinge 14. The cover plate is pivotally attached to the corresponding end of the radio section by a hinge 15. A handle 16 is secured to the cover plate. The section 10 has a front door 17 which serves as a platform for the bellows 18 as shown in Fig. 4. The door 17 closes flush with the wall 19 of the section 10. Adjoining recesses 20, 21 are provided in one side of the several sections as best shown in Fig. 3. In these adjoining recesses is mounted a binocular device 22 embodied in a rectangular casing 23. This optical device has sighting lenses including eyepiece lenses 24 at one end, as shown in Fig. 4, and objective lenses 25 aligned therewith at the other end. At the other end of the casing 23 is located a magnetic directional compass 28. An adjustment knob or wheel 26 is rotatably mounted in the exposed side of the binocular device.

On wall 19 is mounted a clip bracket 29 for supporting a photoflash unit. A generally rectangular U-shaped sighting frame 30 has its arms slidably mounted in eyelets 31. The frame can be extended parallel to wall 19 for sighting as shown in Fig. 4. The frame has a central loop 30'. A window 32 is located at one corner of wall 19 for counting film frames while film is being advanced in the camera section. Knob 33 is provided on the side wall portion 34 for winding the film. A push button 35 is provided on the side wall portion 36 for releasing door 17. Knob 37 is also mounted on wall portion 36 for winding the film. A pair of spring clips 38 is disposed at the sides of recess 21 for retaining the casing 23 therein.

On side 43 of the section 10 is a tab 40 which has a fastener 41. This fastener is detachably secured to a mating fastener on side 44 of section 11. A similar tab 45 with fastener 46 is located on one end of section 11 and is detachably secured to a mating fastener 47 on the side 48 of section 10. A threaded socket 49 on side 48 is provided for mounting the device on a tripod (not shown).

On the exterior wall 50 of section 11 is a looped sighting bar 51. This bar has an opening 52 at one end. The bar is pivotable frictionally on pin 53 in wall 50. On wall 50 may be mounted a radio station tuning dial 56 and a combined on-off switch and volume control knob 57. Behind grill openings 58 in wall 50 may be disposed a loud-speaker for a radio receiver which may be contained in section 11.

Figs. 1 and 2 show the appearance of the device when fully closed. Fig. 3 shows the several jointed or hinged sections fully extended. A rear door 60 on section 10 pivots on a hinge 61 and is used as a cover for the compartment containing film F. A door 62 pivots on hinge 63 and provides access to the interior components C of the radio receiver. To expose the doors 60 and 62 the tabs 40, 45 are released and sections 10 and 11 are pivoted on hinges 14, 15 to which the cover plate 12 is attached. When cover plate 12 is opened it provides access to the film compartment at the top of section 10 beyond door 60. The binocular device 22 is readily removed from recess 21 to release the sections. When the body of device 22 is in place in recesses 20 and 21 it holds the sections 10 and 11 closed and in abutment.

In Fig. 5 the binocular device is shown as comprising a hollow casing 23 in which knob or wheel 26 is rotatably mounted on a shaft 65. This shaft has opposite ends journalled in front and rear walls of casing 23. One end of the shaft has a threaded portion 66 engaged in an aperture in plate 67. This plate carries a pair of objective lenses 68 aligned with lenses 24, 25 for focusing the several lens systems.

In Fig. 6 is shown an accessory kit container 70 mounted on plate 12 between the ends of handle 16. The container is held by clips 71 provided with end fasteners 72. These fasteners engage mating fastener elements 75, 76 on walls 19 and 50, respectively, of the sections 10, 11. In the container may be stored a collapsible tripod, collapsible photoflash unit and other useful photographic accessories, so that the photographer need not carry a separate "gadget" bag for these items.

In Fig. 4 the device is shown with door 17 open and bellows 18 extended. The casing is arranged so that pictures to be taken by means of lens 80 can be sighted in four different ways. Firstly, frame 30 and bar 51 provide an open view finder. Secondly, lenses 81, 82 in mount 83 provide a reflex finder. Thirdly, optical device 22 provides a binocular sighting means with its line of sight substantially parallel to the optic axis of lens 80. It is possible to calibrate the index markings 26' on wheel 26 so that when the binocular device is in focus, the index marking on the wheel will indicate the point at which the retractible lens mounting frame 84 is to be located on the platform. Fourthly, the camera can be sighted merely by looking through the binocular device. If the camera is of fixed focus type or if focusing is not critical this will be a satisfactory alternate method of sighting.

It is possible to mount the binocular device 22 on plate 12 in place of the container 70 and use clips 71 to hold the binocular device in place. This will provide an alternate position for vertical sighting.

While pictures are being taken the radio receiver can, of course, be operating. Frame 30 can serve as an antenna for the radio if desired.

Instead of a bellows type camera, a fixed focus box type camera may be installed in section 10 if desired.

The device described thus provides in one compact unit of minimum weight a casing for a camera together with an accessory storage kit. The binocular device can be used as sport or field glasses while mounted on the device or while separate therefrom.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

An articulated casing for a camera having a lens and shutter, comprising a first generally rectangular hollow section, front and rear doors hinged to said section, the front door exposing said lens and shutter when the door is opened, the rear door providing access to a compartment for photographic film when said rear door is opened, a cover plate hinged to one end of said section for providing further access to said compartment at said one end of said section when said plate is opened, a second generally rectangular section hinged to said cover plate to overlie said rear door and hold the rear door closed, one side of said first section having a first recessed portion with first rectangular side wall extensions, said extensions providing supports for a film winding knob and release button for said front door, said second section having another recessed portion in one side with other wall extensions aligned with the extensions in said first recessed portion, spring means disposed within one of the recessed portions, a sighting means for the camera removably held by said spring means in the recessed portions, said sighting means including a flat rectangular body with aligned openings supporting sighting lenses having a line of sight extending substantially parallel to the optic axis of the first-named lens, said body holding said first and second sections in abutment with the second section overlying said rear door, said sections being released for opening the film compartment when said body is removed from the aligned recesses.

References Cited in the file of this patent

UNITED STATES PATENTS 2,290,307 Wicker ---------------- July 21, 1942

OTHER REFERENCES

Washington Shopping News, Nov. 9, 1948.